March 28, 1939.   B. B. KAHN   2,152,261
STOVE
Filed June 30, 1936
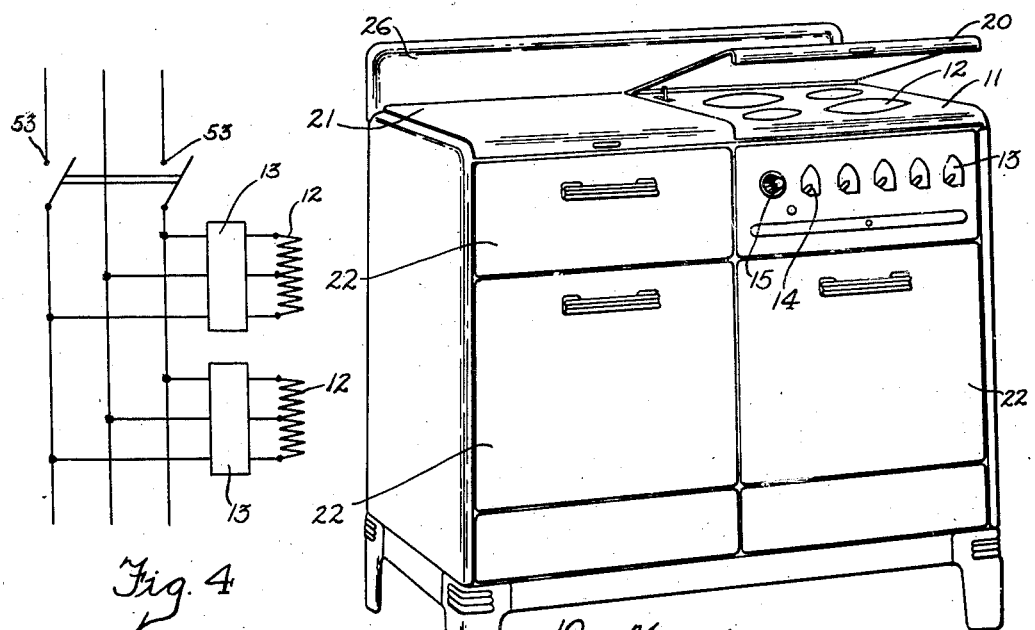
Fig. 1
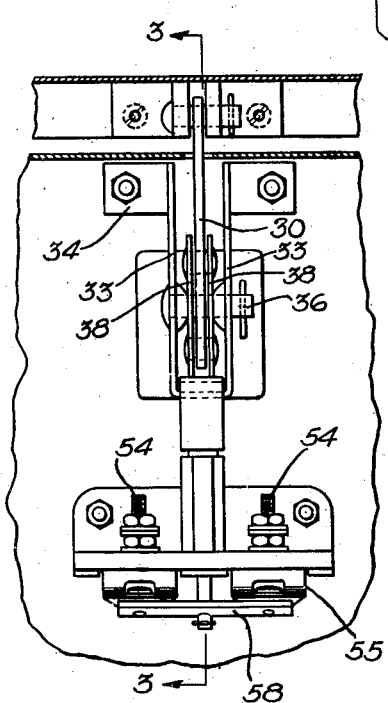
Fig. 4
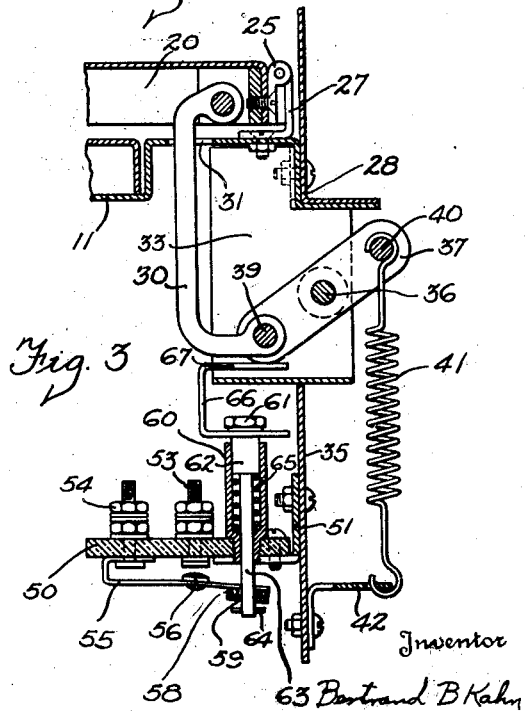
Fig. 2
Fig. 3
Inventor
Bertrand B Kahn
By Maréchal & Noe
Attorneys Patented Mar. 28, 1939

2,152,261

UNITED STATES PATENT OFFICE 2,152,261

STOVE

Bertrand B. Kahn, Cincinnati, Ohio, assignor to The Estate Stove Company, Hamilton, Ohio, a corporation of Ohio Application June 30, 1936, Serial No. 88,169

5 Claims. (Cl. 219—37)

This invention relates to stoves and particularly to electric stoves.

It is a principal object of the invention to provide a stove having a cooking top heating element and a cover adapted to be positioned in concealing relation thereto and including means for preventing the operation of the heating element when the cover is placed in its lowered covering position.

It is a further object to provide in a stove having cooking top heating elements, a cover hingedly mounted on the stove and adapted to occupy a concealing position with respect to the heating elements and including assurance that whenever the cover is closed the heating elements will be deenergized.

It is a further object to provide in a stove of this character a simple and effective counterbalance mechanism for use with the cover.

It is a still further object to provide an electric range of this character in which the means for deenergizing the cooking top element is operatively associated with the counterbalance mechanism for the cover to provide an effective and compact operating mechanism.

Other objects and advantages will be apparent from the following description, the accompanying drawing and the appended claims.

In the drawing—

Fig. 1 is a perspective view of a stove constructed in accordance with the present invention;

Fig. 2 is a partial elevational view showing the switch and counterbalance structure of the stove;

Fig. 3 is a vertical sectional view through the mechanism shown in Fig. 2 on the line 3—3; and Fig. 4 is a partial diagrammatic view showing the electrical connections for the cooking top elements.

Referring to the drawing which discloses a preferred embodiment of the invention the stove, shown generally at 10, comprises a cooking top surface 11 within which are positioned a plurality of cooking top heating elements 12. These elements are arranged in suitable location upon the top of the oven, preferably grouped upon one side thereof as illustrated. Individual control switches 13 mounted upon the front face of the stove provide for regulating the operations of these cooking top elements respectively, preferably providing for the connection of each one to the power lines in different relationships to provide for obtaining different rates of operation and degrees of heat. A separate control member 14 may be provided for controlling the oven heating element, and a temperature regulating thermostat 15 having a control member adjustable upon the face of the stove provides for regulating the oven temperature.

A cover member indicated generally at 20 is hingedly mounted upon the top of the stove, at the rear thereof, and capable of being lowered into a concealing position directly overlying the cooking top elements. A similar cover 21 may be provided upon the remainder of the top of the range, which upon opening, is adapted to expose either a plane work table surface, or a grilling plate or the like.

The stove comprises the usual doors 22 which are suitably mounted to provide for opening to permit access to the broiler compartments, the oven, and to a utensil receiving drawer.

In accordance with the present invention means are provided for assuring that the cover 20 will not be closed upon the cooking top elements when any of them is energized. If the control switches 13 are so regulated that any one of the cooking top elements is energized, the closing of the cover 20 into its lowered position directly effects the deenergizing of such heating element, thereby assuring that at all times when the cooking top cover is lowered into its concealing position, the heating elements will all be deenergized to avoid unnecessary waste of energy, and possible damage to the cover structure.

For this purpose the cover 20 is supported upon hinge members 25 at the rear thereof, and positioned closely adjacent the mantel back 26. The fixed portion 27 of the hinge is preferably bolted directly to the main frame portion 28 of the stove to provide proper support therefor.

Pivotally connected to the inner surface of the cover at one side thereof is a link member 30 which passes downwardly through an aperture 31 formed through the cooking top surface 11. Positioned in an enclosed location beneath the cooking top and directly in alignment with the link 30 is a mechanism for effecting counterbalancing of the cover, and for effecting the control of the deenergizing of the heating elements. This mechanism comprises a pair of frame members 33 having outwardly turned supporting feet 34 which are bolted directly to the rear wall of the stove 35. A pivot pin 36 is mounted upon the frame members 33, and provides a support for a lever structure 37. This lever comprises a pair of plates such as suitable sheet metal stampings 38 which are spaced apart a suitable distance to provide for receiving the link 30 therebetween, and which are connected at their opposite ends by means of cross rivets 39 and 40 respectively. Link 30 is directly mounted upon rivet 39 so as to effect rocking motion of the lever structure in response to the opening and closing of the cover.

A resilient member 41 adapted to serve as a counter-balancing spring is hooked at one end over the rivet 40, the other end of the spring being attached to a fixed bracket 42 mounted upon the rear wall of the stove. As will be obvious, in response to lowering of the cover the link 30 is moved downwardly, causing the inner end of lever 37 to rock downwardly thereby raising the outer end. Such raising movement effects the tensioning of spring 41. Preferably the spring is of such character as to substantially balance the weight of the cover, permitting the cover to stand substantially in any position of adjustment.

In order to effect the deenergization of the cooking elements in response to the lowering of the cover, switch means are provided mechanically associated and interlocked with the previously described counterbalancing mechanism and with cover 20. For this purpose a contact assembly plate 50 of insulating material is mounted upon the rear wall 35 of the stove by means of brackets 51, the contact assembly standing at substantially right angles to the stove wall. The assembly includes two pairs of contacts 53 and 54. Contacts 53 are adapted to be connected to the power lines, and contacts 54 are connected in the circuit for energizing the cooking top elements.

Attached to each of the contact members 54 is a resilient spring and contact carrying member 55, carrying a pair of movable contacts 56 adapted to cooperate with the fixed contacts 53 to effect closing of the circuit from the power source to the heating elements. The spring 55 is of such characteristics that when unconfined it tends to open normally to effect a spacing of contacts 56 and 53, and thus to effect deenergizing of the cooking top elements.

In order to effect the closing of the contacts and the consequent energization of the heating elements, the ends of the two springs 55 are fastened to a cross bar 58 of suitable insulating material having an aperture 59 therein located at an intermediate position between the two springs. Mounted upon the block 50 is a stud 60 extending upwardly therefrom. This stud is suitably recessed to provide for receiving an operating plunger 61 having an enlarged head 62 and a lower portion of reduced diameter 63 which passes downwardly therethrough, and through the aperture 59 in the movable bar 58, through which it passes freely. Means such as a cotter pin 64 fastened to the lower end of this pin serves to engage the bar 58 when the pin moves upwardly and to thereby effect the lifting of bar 58 with resultant simultaneous closing of the two pairs of contacts 56, 53.

Spring means 65 seated within the recessed portion of stud 60 is adapted to engage the enlarged head 62 of plunger 61, tending to raise the plunger. A substantially U-shaped bracket 66 is fastened to the top of the plunger, the upper arm 67 thereof lying directly within the range of operation of lever 57. Spring 65 is of such characteristics that it will overcome the resilient character of the spring supports 55, and when unconfined, will lift its pin 63 to thereby effect the closing of the contacts 56, 53.

It is believed that the operation of the device will be clearly apparent from the foregoing. When the cover is raised, link 30 effects the lifting of the inner end of lever 37 away from the bracket arm 67, permitting spring 65 to raise the plunger. The portion 63 of the plunger moves upwardly until cotter pin 64 engages cross bar 58, continued movement then causing contacts 56 to close on contacts 53. The circuit to the cooking top elements is thus established, the energization of each individual element being under the control of its associated switch 13. As shown in the circuit diagram a three-wire power source is preferably provided, including a neutral wire and two outside wires, the breaking of the main or outside wires as illustrated providing for completely deenergizing the cooking top units as well understood. The several switches 13 provide for connecting the cooking top elements 12 in a plurality of ways to the three-wire power source to provide for obtaining desired heat conditions therefrom. When however the cover is moved to its lowered position control of the cooking top elements is withdrawn from switch 13 and any connected element is deenergized and maintained thus until the cover is lifted again. As the cover moves downwardly link 30 moves downwardly lowering the inner end of lever 37 into contact with the operating member 67. Downward motion of plunger 61, against spring 65, releases the pressure upon cross bar 58, thereby allowing contacts 56 to be withdrawn from contacts 53 under the resilient action of springs 55. Pin 62 passes on through aperture 59 as required to permit full downward closing of the cover 20. And simultaneously with such operation the spring 41 is flexed to provide for counterbalancing the weight of the cover. Conversely upon raising the cover the contact assembly is again closed to restore control of the cooking top elements to the respective control switches 13.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A stove of the character described comprising a cooking top, a plurality of heating elements positioned within said cooking top, a cover mounted on said cooking top for movement into and away from a concealing position overlying said cooking top, a cut-out switch in circuit with said heating elements positioned within an enclosed location within the stove beneath the cooking top and removed from the heat thereof, mechanism for counterbalancing the cover including an operating connection extending downwardly through said cooking top and connecting with said cover, and means for effecting actuation of said cut-out switch to open circuit position in response to movement of said connection upon the lowering of said cover.

2. A stove of the character described comprising a cooking top, a plurality of heating elements positioned within said cooking top, a cover mounted on said cooking top for movement into and away from a concealing position overlying said cooking top, a cut-out switch in circuit with said heating elements positioned within an enclosed location within the stove beneath the cooking top and removed from the heat thereof, mechanism for counterbalancing the cover including a pivoted lever positioned beneath the cooking top, an operating link connecting said cover and said lever for effecting movement of said lever in response to movement of said cover, and means for effecting actuation of said cut-out switch to open circuit position in response to movement of said lever upon the lowering of said cover.

3. A stove of the character described comprising a cooking top, a plurality of heating elements positioned within said cooking top, a cover mounted on said cooking top for movement into and away from a concealing position overlying said cooking top, a cut-out switch in circuit with said heating elements positioned within an enclosed location within the stove beneath the cooking top and removed from the heat thereof, said cut-out switch comprising switch means normally urged to open circuit position, an operating plunger associated with said switch means, resilient means for actuating said plunger to effect the closing of said switch means against its tendency to open, operating means connected to said cover and extending downwardly through said cooking top, and means adapted to engage said operating means in the lowered position of said cover for actuating said plunger to a release position such that said switch means moves into open circuit position.

4. A stove of the character described comprising a cooking top, a plurality of heating elements positioned within said cooking top, a cover mounted on said cooking top for movement into and away from a concealing position overlying said cooking top, a cut-out switch in circuit with said heating elements positioned within an enclosed location within the stove beneath the cooking top and removed from the heat thereof, said cut-out switch comprising switch means normally urged to open circuit position, an operating plunger associated with said switch means, resilient means for actuating said plunger to effect the closing of said switch means against its tendency to open, mechanism for counterbalancing the cover, an operating connection extending downwardly through said cooking top and interconnecting said cover and said counterbalancing mechanism, and means operative as a result of lowering of said cover for actuating said plunger to a release position such that said switch means moves into open circuit position.

5. A stove of the character described comprising a cooking top, a plurality of heating elements positioned within said cooking top, a cover mounted on said cooking top for movement into and away from a concealing position overlying said cooking top, a cut-out switch in circuit with said heating elements positioned within an enclosed location within the stove beneath the cooking top and removed from the heat thereof, mechanism for counterbalancing the cover including a pivoted lever positioned below the cooking top, a counterbalancing spring attached to said lever, an operating link extending downwardly through the cooking top and interconnecting said cover with said lever to provide for counterbalancing of said cover in its raising and lowering movements, and means operatively associated with said cut-out switch and adapted to cause actuation of said cut-out switch to open circuit position in response to the movement of said lever following upon the lowering movement of said cover.

BERTRAND B. KAHN.